United States Patent
Sone et al.

(10) Patent No.: US 7,898,195 B2
(45) Date of Patent: Mar. 1, 2011

(54) MOTOR DRIVE DEVICE

(75) Inventors: Toshiaki Sone, Inuyama (JP); Akira Sakoguchi, Inuyama (JP); Hiroyuki Ueki, Inuyama (JP); Takeshi Nakamura, Kanagawa (JP); Akira Sasaki, Kanagawa (JP)

(73) Assignees: Kabushiki Kaisha Imasen Denki Seisakusho, Inuyama (JP); NHK Spring Co., Ltd, Yokohama (JP)

( * ) Notice: Subject to any disclaimer, the term of this patent is extended or adjusted under 35 U.S.C. 154(b) by 566 days.

(21) Appl. No.: 11/945,386

(22) Filed: Nov. 27, 2007

(65) Prior Publication Data

US 2009/0039812 A1    Feb. 12, 2009

(30) Foreign Application Priority Data

Nov. 29, 2006   (JP) .............................. 2006-321837

(51) Int. Cl.
*H02P 1/00*    (2006.01)
(52) U.S. Cl. ...................... 318/280; 318/265; 318/266; 318/282; 318/434
(58) Field of Classification Search ................ 318/264, 318/265, 266, 280, 281, 282, 283, 284, 286, 318/434, 461, 463, 466, 467, 468
See application file for complete search history.

(56) References Cited

U.S. PATENT DOCUMENTS 4,451,887 A * 5/1984 Harada et al. ................. 701/49
4,467,252 A * 8/1984 Takeda et al. ............... 318/603
4,514,670 A * 4/1985 Fassel et al. ................. 318/467
4,698,571 A * 10/1987 Mizuta et al. ............ 318/568.1
4,870,333 A * 9/1989 Itoh et al. .................... 318/286
4,922,170 A * 5/1990 Kawasaki et al. ........... 318/434
7,224,136 B2 * 5/2007 Saitou et al. ................. 318/286
7,388,339 B2 * 6/2008 Held .......................... 318/283
2001/0003806 A1 * 6/2001 Swan et al. .................... 701/49

FOREIGN PATENT DOCUMENTS

| JP | 3181461 | 8/1995 |
|---|---|---|
| JP | 2004-330703 | 9/2004 |
| JP | 2005-330703 | 12/2005 |
| JP | 2006-82626 | 3/2006 |

* cited by examiner

*Primary Examiner*—Walter Benson
*Assistant Examiner*—Thai Dinh
(74) *Attorney, Agent, or Firm*—Lucas & Mercanti, LLP

(57) ABSTRACT

The present invention presents a motor drive device capable of detecting jamming accurately without falsely detecting jamming when a movable part contacts with other members. Jamming by a backrest is detected by judging whether the value of a period of one pulse P1 and a period of the next pulse P2 (P2/P1) integrated for 150 times (integrated value: 150) exceeds a specified threshold (160) or not. Accordingly, if the backrest rubs against a backrest of an adjacent seat, and the motor speed suddenly drops for a short period, such "warp" is not falsely detected as jamming, and only actual jamming can be detected securely.

3 Claims, 10 Drawing Sheets

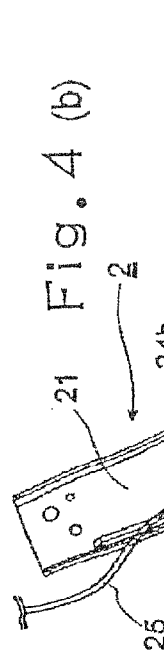
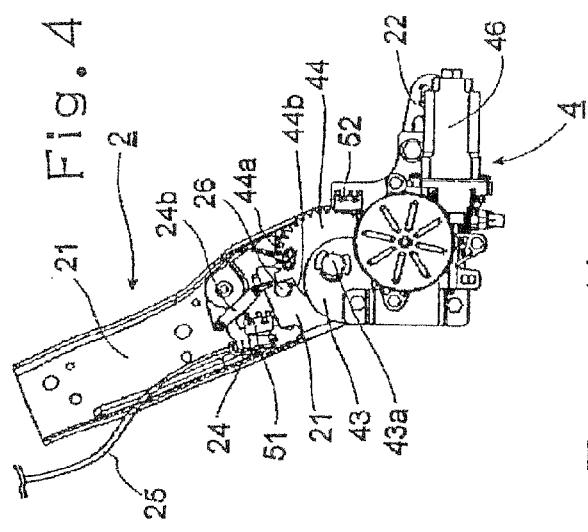
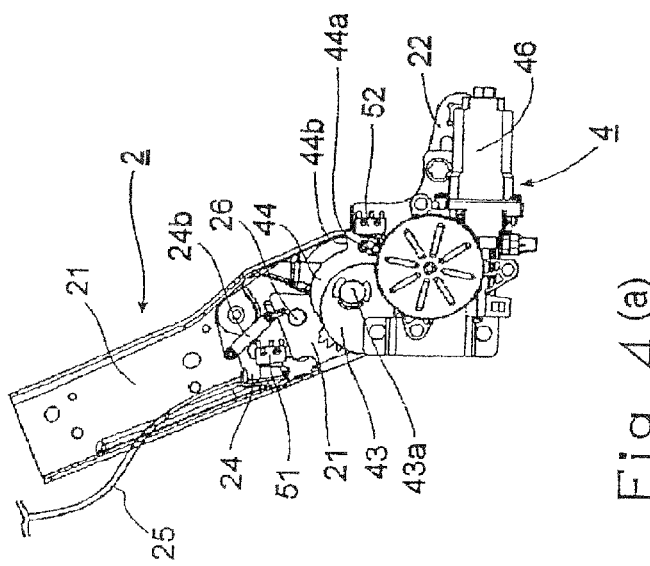
Fig. 4 (a)
Fig. 4 (b)
Fig. 4 (c)

Fig. 7
(A)
$\dfrac{A_N}{A_{N-x}}$
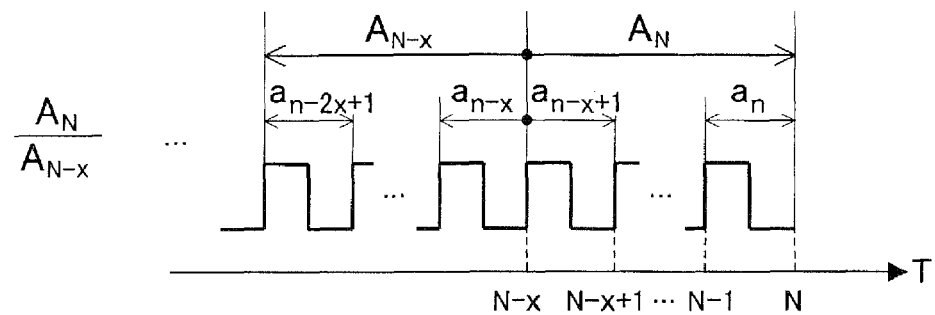
(B)
$\dfrac{A_{N-1}}{A_{N-x-1}}$
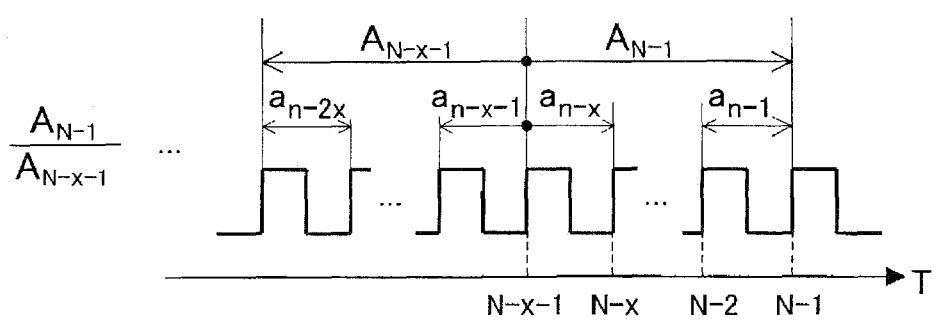
(C)
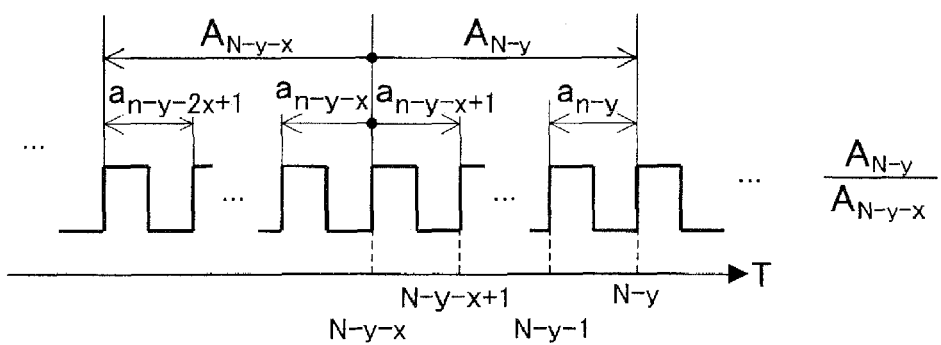

Fig. 8
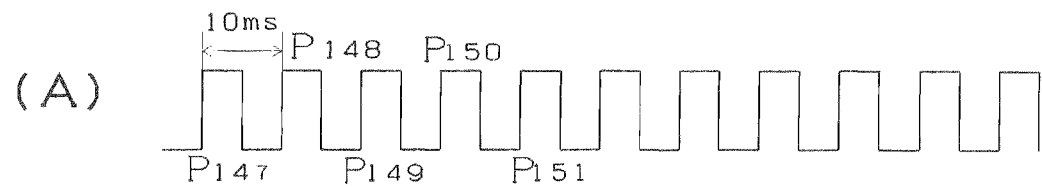
(A)
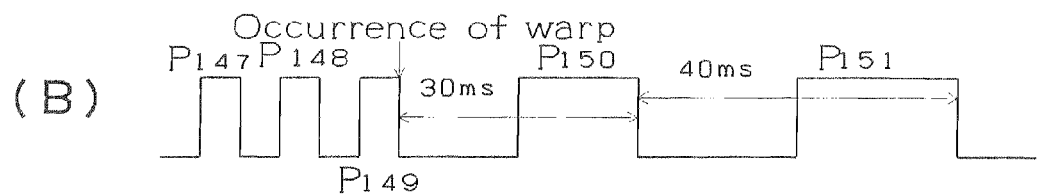
(B)
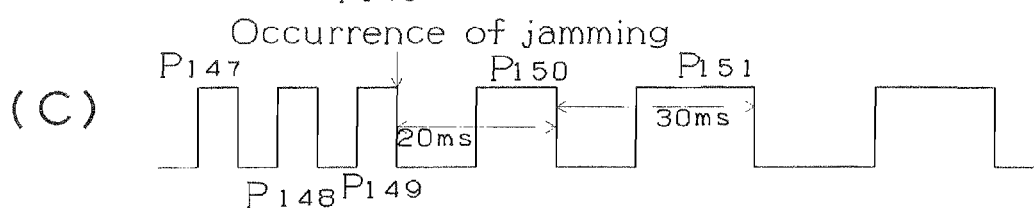
(C)
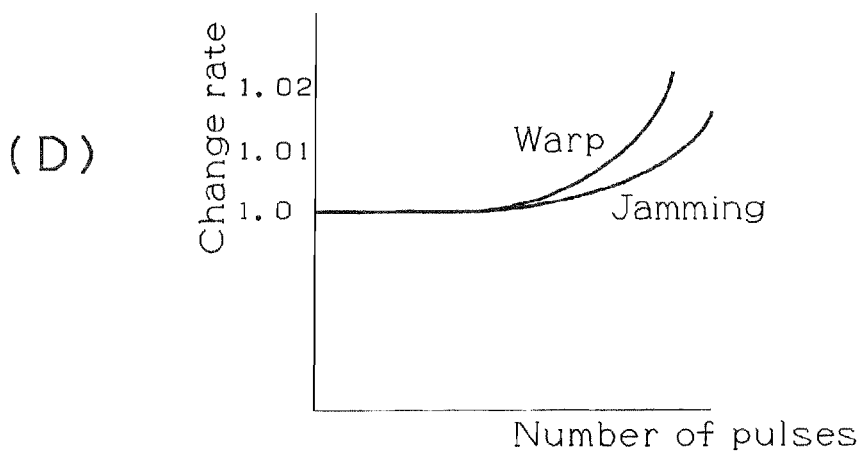
(D)
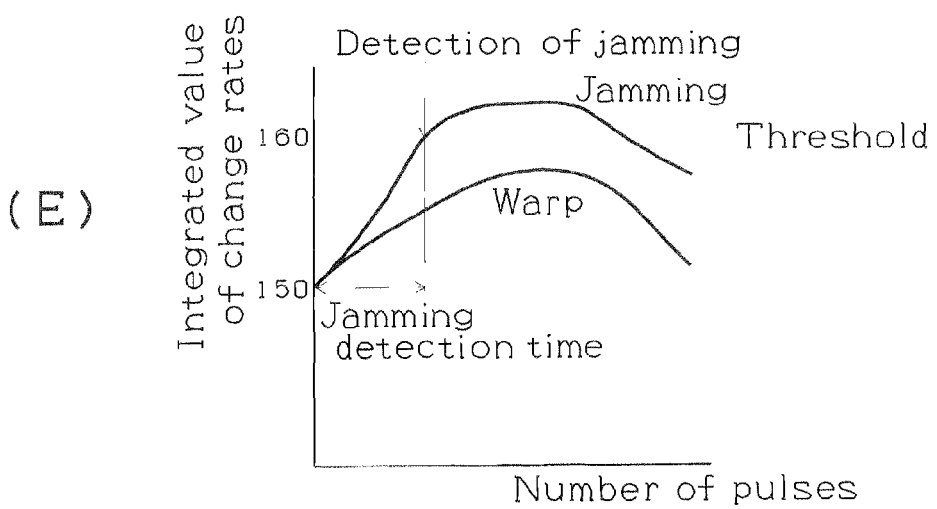
(E)

Fig. 10
(A)
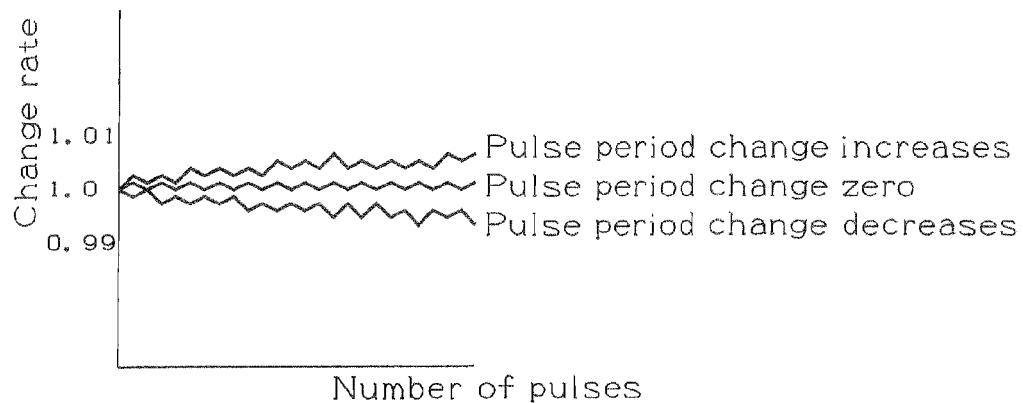
(B)
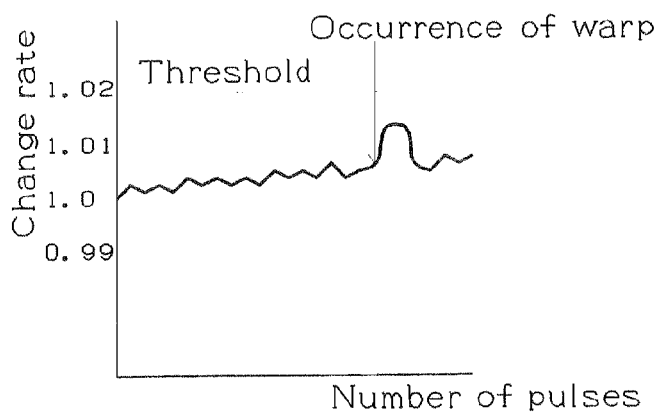
(C)
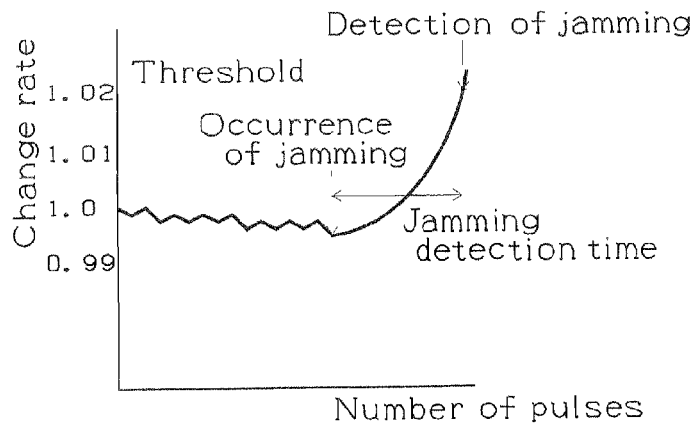

MOTOR DRIVE DEVICE

CROSS-REFERENCE TO RELATED APPLICATION

The present application claims priority under 35 U.S.C. §119 to Japanese Patent Application No. JP2006-321837. The contents of these applications are incorporated herein by reference.

BACKGROUND OF THE INVENTION

1. Field of the Invention

The present invention relates to a motor drive device having a safety stopping function, and more particularly to a motor drive device having a safety stopping function for stopping the motor when a part of human body is jammed, for example, by the movable part driven by the motor.

2. Description of Related Art

Hitherto, a motor drive device having a safety stopping function is used in various components of an automobile, such as a power window, a power seat, or a power trunk, and is designed to protect the human body by stopping the motor when part of the body is jammed by the window, the seat or the trunk driven by the motor.

The compartment of a vehicle of so-called one-box type represented by "mini-van" accommodates two or three rows of seats. In such vehicle, the sea layout can be changed depending on the purpose of use or application by the passengers. In a typical example, the backrests of the seats of the second row or third row are tilted forward, and the backside of the backrests of the second row is used as a table.

When the backrests of the seats are tilted forward (folded), and the backside is used as a table, to raise the seats back to a sitting position, the car door is opened from the flank, and the backrests must be manually raised by the passenger. Such manipulation consumes time and labor and is very disturbing. In such a case it is desired to install a backrest tilting device for raising the backrests by a switch operation from a remote position.

Prior art 1 discloses a motor control device of a motor for driving the power window or the like, in which the current change amount per unit time of the motor is monitored, and jamming of part of the body or other objects by the power window is detected. Prior art 2 discloses a vehicle seat device for detecting jamming by pulse period of a motor. Prior art 3 discloses a jamming detection method in which jamming is detected at high accuracy by using a reference threshold by adding a preliminarily calculated constant to the motor driving current. Prior art 4 discloses a foreign matter jamming detection device in which a jamming detection region is determined, the pulse change amount in the region is monitored when any object gets into the region, and jamming is detected when the change amount exceeds a normal reference value.

[Prior art 1] Japanese Patent No. No. 3181461 is incorporated herein by reference.

[Prior art 2] JP2004-268757 A is incorporated herein by reference.

[Prior art 3] JP2005-3330703 A is incorporated herein by reference.

[Prior art 4] JP2006-82626 A is incorporated herein by reference.

SUMMARY OF THE INVENTION

Problems that the Invention is to Solve

The backrest tilting device may cause jamming of part of body between adjacent backrests when tilted by a motor, and hence requires a safety stopping function.

However, since the backrests of the seats of the second row or the third row are tilted down and used as one body, the gaps of backrests are minimized in design. Accordingly, when raising the backrests, the sides of the adjacent backrests rub against each other, and drag (or warp) occurs momentarily, and if intended to detect jamming by the absolute value of a motor current or a pulse period, such warp may be falsely detected as jamming.

This detection error is specifically described below with reference to FIG. 8 and FIG. 9.

FIG. 8 (A) shows a signal waveform of pulses outputted from a speed detector of the motor, and FIG. 9 (A) shows a graph of a pulse period. While the motor speed is constant, the pulse period is constant. At the constant speed, pulses of the constant period (for example, 10 ms) are outputted.

FIG. 8 (B) shows a pulse waveform when warp occurs, and FIG. 9 (B) shows a graph when warp occurs. When warp occurs, the load is increased suddenly, and the pulse period becomes longer in a short time.

FIG. 8 (C) shows a pulse waveform when jamming occurs, and FIG. 9 (C) shows a graph when jamming occurs. When jamming occurs, the load becomes higher gradually, and the pulse period becomes longer gradually. The load becomes higher gradually because the seat upholstery is soft and the human body is elastic.

In the backrest tilting device, due to assembling error of mechanical parts or fluctuations of characteristics, the pulse period may be larger (for example, 16 ms) or the pulse period may be smaller (for example, 4 ms) as shown in FIG. 9 (D). Accordingly, to set a proper threshold not to confuse warp and jamming while corresponding to such fluctuations, as shown in FIG. 9 (E), the threshold must be set slightly higher (for example, 20 ms), and in the backrest tilting device of the small pulse period (4 ms), the jamming detection time becomes longer, and it takes a longer time until the backseats are stopped from the moment of occurrence of jamming.

To solve this problem, in one method, jamming may be detected from the change of variation amount as disclosed in prior art 1 (differential method).

FIG. 10 (A) is a graph of a change rate of a pulse period. Due to fluctuations of mechanical parts, if the motor speed is constant, the pulse period change may increase or decrease depending on the type of a device. FIG. 10 (B) shows a change rate when warp occurs in a change increasing type, and FIG. 10 (C) shows when warp occurs in a change decreasing type. In the differential method, too, the threshold must be set lightly higher in order to avoid confusion of warp and jamming, and the jamming detection time is longer, and it is difficult to shorten the time until the backseats are stopped from the moment of occurrence of jamming, and it is also difficult to detect jamming securely.

The invention is devised to solve the above problems, and it is hence an object thereof to present a motor drive device capable of detecting jamming accurately without detecting contact of a movable part with other members falsely as jamming.

Means for Solving the Problems

To achieve the above object, the prevent invention presents a motor drive device comprising a motor for driving a movable part, a motor control device for controlling normal rotation, stop or reverse rotation of the motor, and a rotation detector for detecting rotation of the motor and outputting a pulse corresponding to the motor speed, wherein the motor control device detects jamming by the movable part by judging whether the integral value of change amounts of a pulse period from the rotation detector exceeds a specified threshold or not, and stops or inverts the motor.

In the motor drive device in accordance with the more preferred teaching of the present invention, jamming by the movable part is detected by judging whether the integrated value of change amounts of the pulse period from the rotation detector exceeds a specified threshold or not, and brief and sudden drop of the motor speed, such as a case of contact of the movable part with other members, is not falsely detected as jamming, and actual jamming can be detected securely.

In the motor drive device in accordance with the more preferred teaching of the present invention, jamming by the movable part is detected by judging whether the integrated value of the ratio of an arbitrary first number of pulse periods, and the same number of pulse periods as the arbitrary first number issued from the rotation detector after the arbitrary first number of pulses, for an arbitrary second number of times, exceeds a specified threshold or not. Therefore, brief and sudden drop of the motor speed, such as a case of contact of the movable part with other members, is not falsely detected as jamming, and actual jamming can be detected securely.

In the motor drive device in accordance with the more preferred teaching of the present invention, jamming by the movable part is detected by judging whether the integrated value of the ratio of one pulse period and period of pulses outputted after this pulse, for an arbitrary second number of times, exceeds a specified threshold or not. Therefore, brief and sudden drop of the motor speed, such as contact of the movable part with other members, is not falsely detected as jamming, and actual jamming can be detected securely. Moreover, since the period of one pulse is detected, calculation is simple and easy.

In the motor drive device in accordance with the more preferred teaching of the present invention, the movable part is a backrest of a vehicle seat disposed so as to contact with other members, and therefore if the backrest rubs against other members (for example, the backrest of an adjacent seat) and the motor speed suddenly drops for a short period, such phenomenon or warp is not detected falsely as jamming, and actual jamming can be detected securely.

BRIEF DESCRIPTION OF THE DRAWINGS

FIG. 4 shows various states of the reclining device and the rotating device, in which (a) shows the vehicle seat in its sitting position, (b) shows the vehicle seat in a table mode or a baggage compartment mode, and (c) shows the vehicle seat returning to an original state from the table mode.

FIG. 7 is an explanatory diagram of integration of the ratio of an arbitrary first number x of pulse periods, and the same number of pulse periods as the arbitrary first number x outputted from a rotation detector after the arbitrary first number x of pulses for an arbitrary second number y of times in the second embodiment.

FIG. 8 (A) is a waveform diagram of a pulse signal waveform outputted from a motor speed detector, FIG. 8 (B) is a waveform diagram of a pulse waveform upon occurrence of warp, FIG. 8 (C) is a waveform diagram of a pulse waveform upon occurrence of jamming, FIG. 8 (D) is a graph of change rate of a pulse, and FIG. 8 (E) is a graph of an integrated value of change rates of a pulse period.

FIG. 10 (A) is a graph showing a change rate of a pulse period, FIG. 10 (B) is a graph showing a change rate when warp occurs in a change rate increasing type, and FIG. 10 (C) is a graph showing a change rate when jamming occurs in a change rate decreasing type.

DESCRIPTION OF THE PREFERRED EMBODIMENTS

Embodiments of the invention are specifically described below with reference to the accompanying drawings.

First Embodiment

Figure 1:
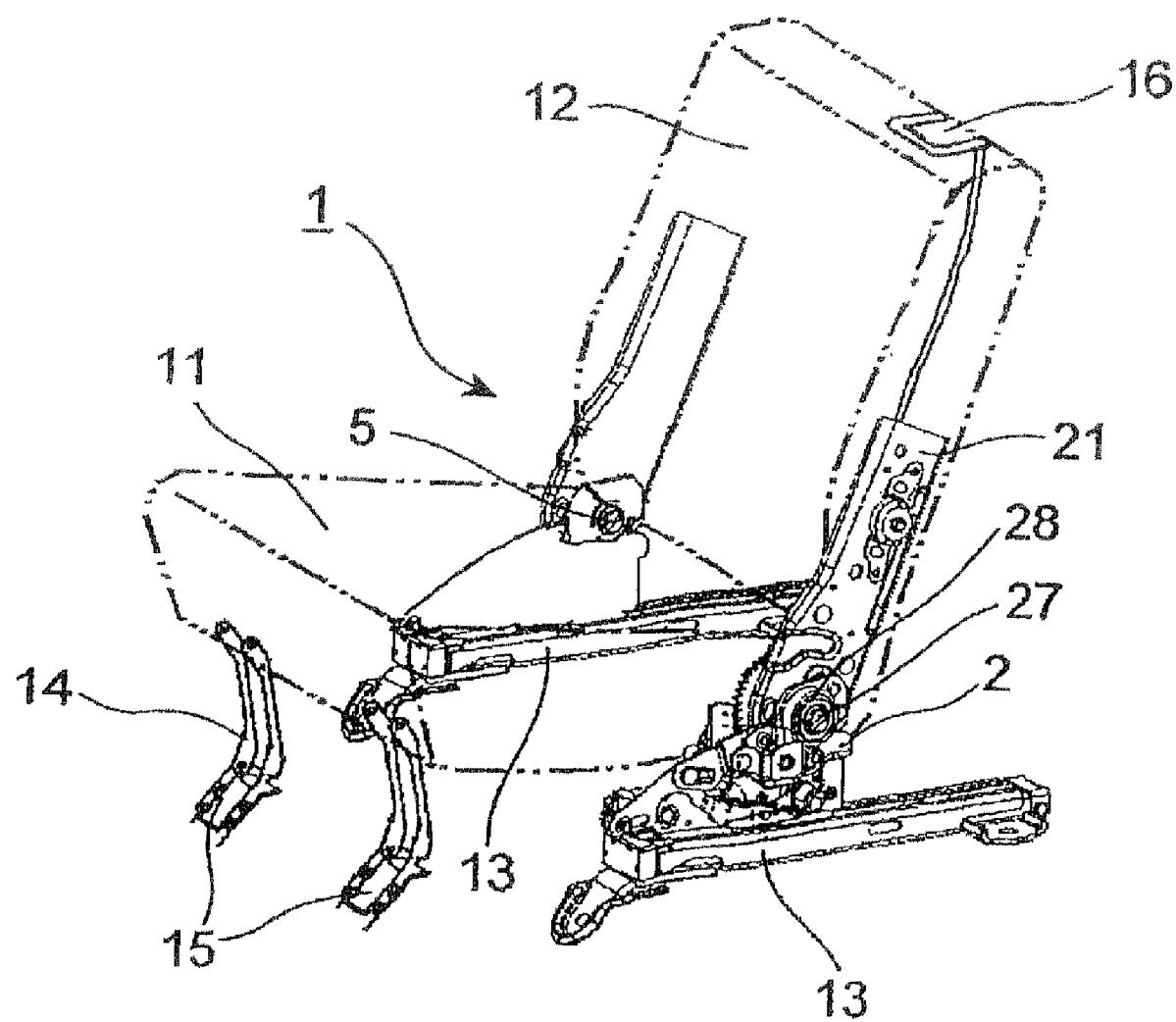
FIG. 1 is a schematic diagram of a vehicle seat in the first embodiment of the invention.

FIG. 1 to FIG. 4 show a vehicle seat 1 having a motor drive device according to a first embodiment. As shown in FIG. 1, the vehicle seat 1 has a seat cushion 11, and a backrest 12, and to link them rotatably, a reclining device 2 is disposed at one side of the linkage part, and a free hinge 5 is disposed at other side. In such configuration, the inclination angle of the backrest 12 can be adjusted and tilted, and seats are adjacently disposed, as not shown, as rear seats of an automobile.

The seat cushion 11 is attached to a seat rail 13 installed on the vehicle floor, and an upper end of a foldable link 14 is rotatably coupled to the front part of the seat cushion 11, and a lower end of the foldable link 14 is rotatably supported to a bracket 15 fixed on the vehicle floor. The backrest 12 is provided with an operation member 16 for unlocking the reclining device 2.

In the first embodiment, the reclining device 2 is disposed only at one side of the backrest 12 and the seat cushion 11, and the free hinge 5 is disposed at the other side.

By manipulation of an unlocking lever, the reclining device 2 is adjustable in inclination angle in multiple stages, and the backrest 12 is quickly tilted forward to a specific angle to allow the passenger to walk in, and the backside of the backrest 12 is used as a table or a part of a trunk compartment. In the first embodiment, since application in rear seats is particularly considered, the reclining device capable of tilting the backrest 12 forward quickly to a desire angle is used. In such configuration, when a passenger manipulates the operation member 16, the backrest 12 is quickly tilted forward until nearly parallel to the seat cushion 11.

The reclining device 2 in the first embodiment is designed to unlock by manipulating an unlocking lever 24 by the operation member 16 provided in the upper part of the backrest 12, instead of directly manipulating the unlocking lever from the side of the seat. As a result, an extra space for manipulating the unlocking lever 24 is not required at the side of the vehicle seat 1. Therefore, the invention is applied in the central seat of a three-seat layout, the passenger can manipulate easily.

Figure 2:
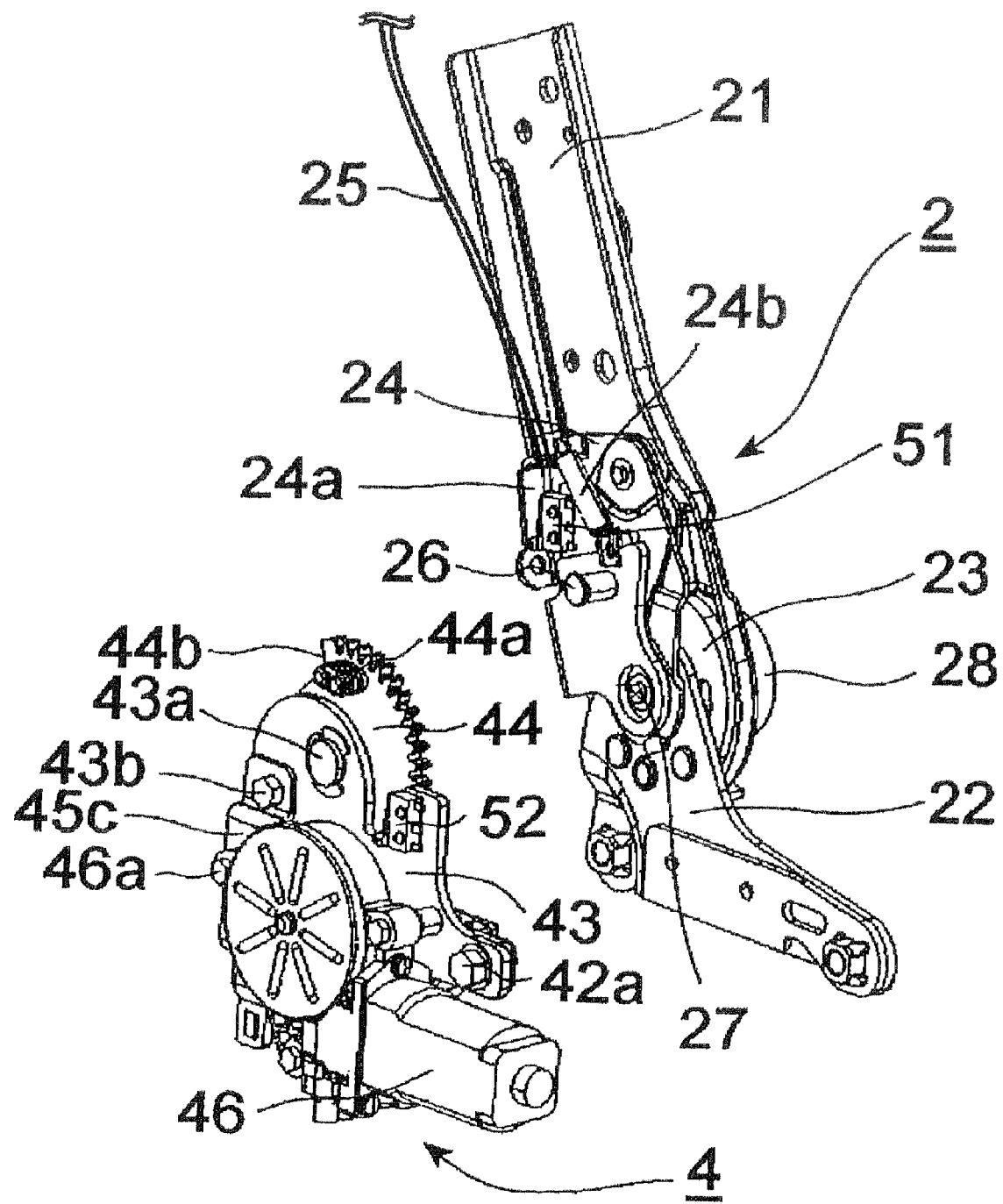
FIG. 2 is a perspective view of a reclining device provided in the vehicle seat in FIG. 1.

FIG. 2 is an inside view of the reclining device 2 shown in FIG. 1 as seen obliquely from above. The reclining device 2 may be a conventional one as mentioned above, and includes a backrest side bracket 21 attached to the backrest 12, and a seat cushion side bracket 22 attached to the seat cushion 11. The backrest side bracket 21 is provided to be rotatable on the seat cushion side bracket 22 about a rotary shaft 27, and a spiral spring 28 is biased to incline the backrest side bracket 21 always forward.

The backrest side bracket 21 and the seat cushion side bracket 22 are held at a desired angle by operation of a lock mechanism 23. The backrest side bracket 21 has a bump 26 to be engaged with a rotating member of a rotating device 4 (described below). The lower part of the seat cushion side bracket 22 is fixed to a bracket (corresponding to an upper rail not shown) to be engaged with the seat rail 13.

The lock mechanism 23 of the reclining device 2 is unlocked by manipulation of the unlocking lever 24 by a passenger, and the angle of the backrest 12 can be adjusted. The unlocking lever 24 is always biased in a direction to lock the lock mechanism 23 by a spring 24b, The unlocking lever 24 is coupled to the operation member 16 by a wire 25 as a coupling member, and by manipulating the operation member 16, the lock mechanism 23 can be unlocked. A claw 24a is provided at the leading end of the unlocking lever 24, and the claw 24a contacts with a first limit switch 51 provided in the backrest side bracket 21 while the unlocking lever 24 is not manipulated (the reclining device 2 is locked), and the first limit switch 51 is held in ON state.

Figure 3:
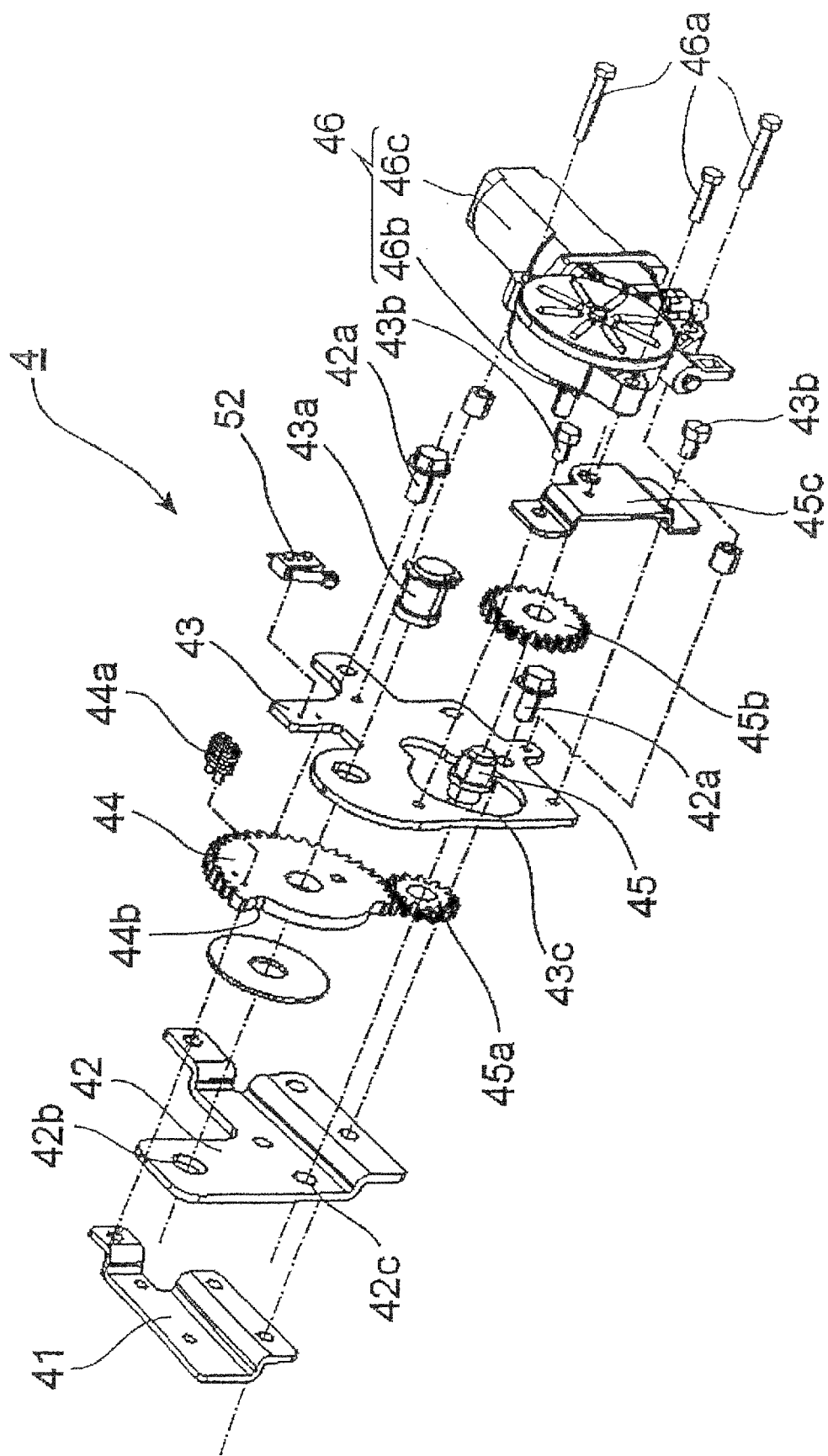
FIG. 3 is a perspective exploded view of a rotating device provided in the vehicle seat in FIG. 1.

FIG. 3 is a perspective exploded view of the rotating device 4 shown in FIG. 2. The rotating device 4 is attached to the seat cushion side bracket 22 by way of a mounting bracket 241. The mounting bracket 41 is provided with a base plate 42, which is fixed together with a holding bracket 43 by means of bolts 42a, 42a. A holding hole 42b is provided in the upper part of the base plate 42, and one end of a center shaft 43a is inserted in the holding hole 42b while the other end is inserted in the holding bracket 43. In this configuration, a sector gear 44 pivoted by the center shaft 43a is free to rotate. The center shaft 43a is coaxially coupled with the rotary shaft 27 of the reclining device 2 when mounting the rotating device 4 on the seat cushion side bracket 22. As a result, the rotating device 4 can be positioned in the reclining device 2 securely.

One end of a gear holding pin 45 is inserted in a mounting hole 42c of the base plate 42, and the other end of the gear holding pin 45 is supported by a gear holding bracket 45c. The gear holding pin 45 has its central portion projecting like a flange, and a reduction gear 45a is inserted at one side, and a transmission gear 45b inserted at the other side, and the reduction gear 45a and transmission gear 45b rotate simultaneously with the gear holding pin 45. The gear holding bracket 45c is attached to the holding bracket 43 by means of pins 43b, 43b, and an insertion hole 43c is provided in the holding bracket 43. The gear holding pin 45 and the transmission gear 45b are inserted in the insertion hole 43c.

A motor unit 46 is mounted and fixed on the holding bracket 43 by means of a mounting pin 46a. The motor unit 46 includes a motor gear 46b and a motor 46c, and the motor gear 46b is engaged with the transmission gear 45b. When the motor gear 46b is driven by the motor 46c, the transmission gear 45b is put in rotation, and hence the gear holding pin 45 and the reduction gear 45a rotate at the same time, and the sector gear 44 engaged with the reduction gear 45a is also put into rotation. The sector gear 44 has a notch 44b, and this notch 44b is engaged with a bump 26 of the backrest side bracket 21.

The sector gear 44 has an operation protrusion 44a, which contacts with a second limit switch 52 fixed to the holding bracket 43 while the rotating device 4 is not operating, and a power ON state is maintained. The first limit switch 51 provided in the backrest side bracket 21 and the second limit switch 52 fixed in the holding bracket 43 are used for controlling the rotation of the motor 46c of the motor unit 46, and when the first limit switch 51 reacts, rotation of the motor 46c is inverted, and when the second limit switch 52 reacts, rotation of the motor 46c is stopped.

With reference now to FIG. 4, operation of the vehicle seat 1 of the invention is explained. FIG. 4 shows the state of the reclining device 2 and the rotating device 4 when the vehicle seat 1 is manipulated, in which (a) shows the vehicle seat 1 in its sitting position, (b) shows the vehicle seat 1 in a table mode or a baggage compartment mode, and (c) shows the vehicle seat 1 returning to an original state from table mode.

In the usual mode of the vehicle seat 1 in the first embodiment, the unlocking lever 24 of the reclining device 2 is biased in a direction of locking the lock mechanism 23 by the spring 24b. Hence, the lock mechanism 23 is locked, and the backrest side bracket 21 is held at an arbitrary angle to the seat cushion side bracket 22. As a result, the backrest 12 is held at an arbitrary angle to the seat cushion 11.

On the other hand, when manipulating the reclining device 2 for adjusting the inclination angle of the backrest 12, a passenger manipulates the operation member 16 provided in the upper part of the backrest 12. When the operation member 16 is manipulated, the wire 25 linked to the operation member 16 is pulled, and the unlocking lever 24 linked with the wire 25 is rotated. By manipulating the unlocking lever 24 through the operation member 16, the lock mechanism 23 is unlocked, and reclining operation is allowed, so that the angle of the backrest 12 can be adjusted. When the passenger releases the operation member 16 at a desired position, the unlocking lever 24 biased by a spring is rotated to lock the lock mechanism 23, and the backrest 12 can be held at the desired position (angle).

When the lock mechanism 23 is unlocked by manipulating the operation member 16 and rotating the unlocking lever 24, the backrest 12 starts to incline forward by the biasing force of the spiral spring 28. The inclination angle of the backrest 12 can be finely adjusted within a sitting range by the passenger, and can be also tilted forward further to a maximum extent until almost parallel to the seat cushion 11. As a result, the backside of the backrest 12 can be used as a table or a part of a baggage compartment.

When the vehicle seat 1 is used as a table or a part of a baggage compartment, as shown in FIG. 4 (b), the bump 26 provided at the backrest side bracket 21 abuts against the notch 44a of the sector gear 44 of the rotating device 4. When the vehicle seat 1 is in this position, the unlocking lever 24 is detained in the unlocking position of the lock mechanism 23, and the claw 24a of the unlocking lever 24 is departed from the first limit switch 51.

When returning the vehicle seat 1 to the original sitting position from the table mode or the mode as a part of a baggage compartment, the backrest 12 can be manually reset by the passenger, or the rotating device 4 may be driven to reset by remote control from the driver's seat or other places.

By switch operation from the driver's seat, when the motor 46c of the motor unit 46 is operated, the motor gear 46b is driven, and the transmission gear 45b engaged with the motor gear 46b is also put into rotation. The torque of the transmission gear 46b is transmitted to the reduction gear 45a by way of the gear holding pin 45, and the sector gear 44 engaged with the reduction gear 45a is also put into rotation. When the sector gear 44 rotates, the bump 26 of the backrest side bracket contacting with the notch 44a of the sector gear also rotates, and the backrest side bracket 21 (backrest 12) rotates (returns) to a backward tilting direction.

When the backrest side bracket 21 returns to a specified position, the unlocking lever 24 is biased by the spring 24b to rotate to the locking position, and the lock mechanism 23 is locked. Nearly at the same time, the claw 24a of the unlocking lever abuts against the first limit switch 51, and the first limit switch 51 is turned on (FIG. 4 (c)). When the first limit switch 51 is turned on, rotation of the motor 46c is inverted. As a result, rotation of the sector gear 44 is also inverted, and when rotating to the original position, the operation protrusion 44a of the sector gear 44 abuts against the second limit switch 52, and the second limit switch 52 is turned on. As a result, rotation of the motor 46c is stopped, and the vehicle seat 1 can be used in the sitting position (FIG. 4 (a)). That is, the angle of the backrest can be freely adjusted again without interference of the sector gear 44.

Figure 5:
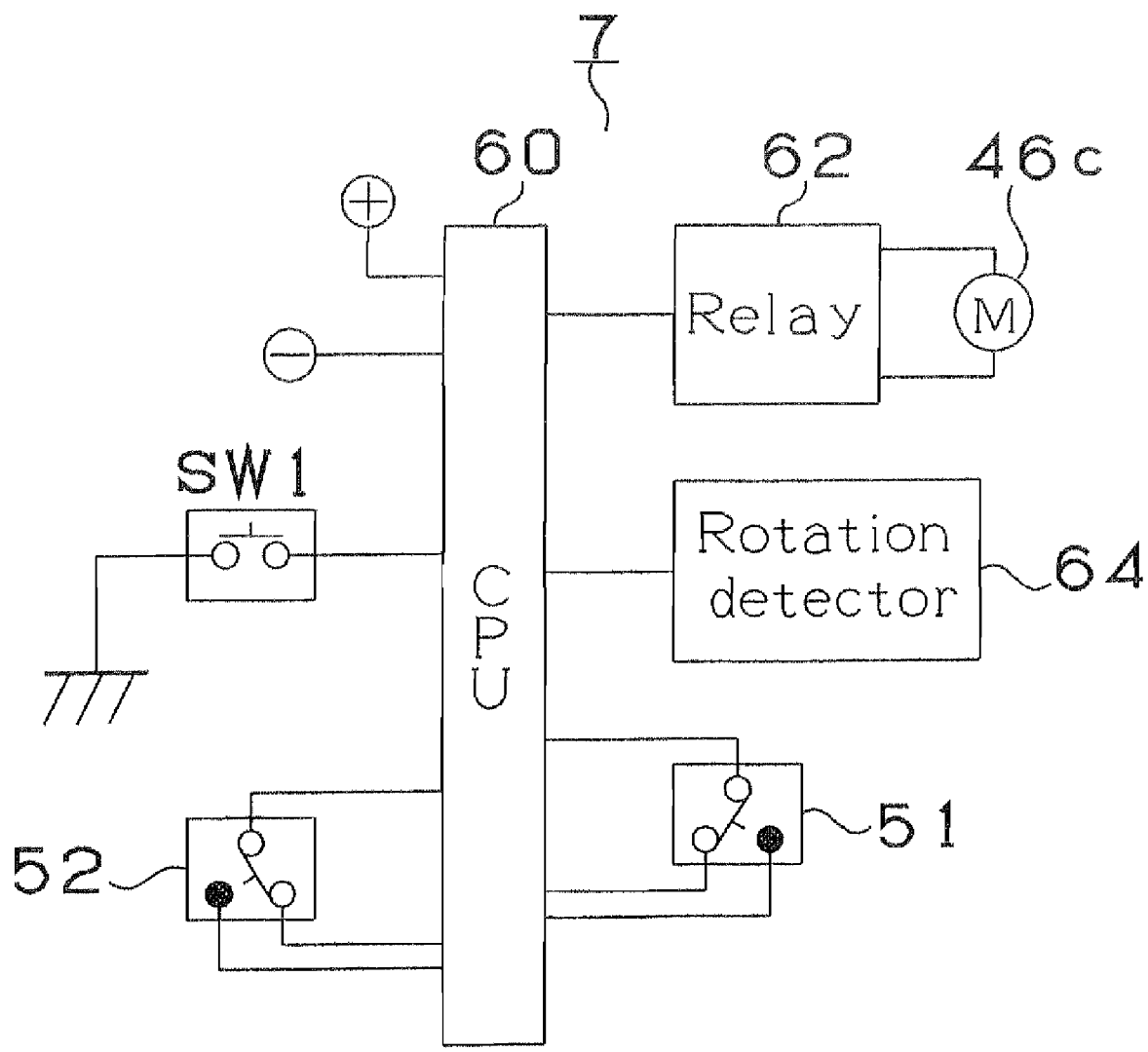
FIG. 5 is a block diagram of a control circuit used in the vehicle seat in FIG. 1.

FIG. 5 shows a control circuit 7 used in the vehicle seat 1. The control circuit 7 for controlling the rotating device 4 includes limit switches 51, 52. A switch SW1 is for operating the rotating device 4. The switch SW1 is installed near the driver's seat apart from the vehicle seat 1, and is means for remote control of the rotating device 4.

To return the backrest 12 to the sitting position from the forward titled position, the switch SW1 of the control circuit 7 for driving the rotating device 4 is manipulated. As a result, a CPU 60 rotates the motor 46c normally by way of a relay circuit 62. When the motor 46c rotates, the sector gear 44 also rotates, and the operation protrusion 44a of the sector gear is released from the limit switch 52, and the limit switch 52 is turned off (dark spot in the diagram).

When the backrest 12 is returned as the sector gear 44 is engaged with the bump 26 of the backrest side bracket, the lock mechanism 23 is locked, and the unlocking lever 24 rotates to the locking position, and the claw 24a is abutted with the limit switch 51, and the limit switch 51 is turned on again. At this time, the limit switch 52 is turned off, and it is detected, and the CPU 60 inverts rotation of the motor 46c by way of the relay 62. The motor 46c rotates reversely, and the sector gear 44 rotates to the original position, and the operation protrusion 44a abuts against the limit switch 52, and the limit switch 52 is turned on. When it is detected, the CPU 60 stops reverse rotation of the motor 62c. That is, the sector gear 44 returns to the home position, and the backrest can be freely adjusted in angle again without interference of sector gear 44.

In this manner, while the limit switch 51 is turned on, the unlocking lever 24 is not active, that is, the reclining device 2 is locked, and while the limit switch 52 is turned on, the sector gear 44 is not active, that is, the rotating device 4 is not operating.

Control of the motor 46c by the CPU 60 is explained with reference to the flowchart in FIG. 6.

When the switch SW1 is turned on (Yes at S12), the motor 46c is rotated normally, and the backrest is raised (S14). The motor speed is monitored by a pulse signal from the rotation detector 64 shown in FIG. 5, and the change rate of a pulse period is judged to be under a specified value or not described specifically below, and jamming is detected (S16). When jamming is not occurred (No at S16), it is judged if raising of the backrest is completed or not by the limit switch 51 (S20). Until raising of the backrest is completed (No at S20), rotation of the motor 64c continues (S14). When raising of backrest is completed (Yes at S20), the motor 64c is stopped (S18), and is rotated reversely (S22), and the sector gear 44 returns to the home position. The sector gear 44 returns to the home position, and the limit switch 52 is turned on (Yes at S24), and the motor stops, and the process is terminated (S26).

During normal rotation of the motor 64c, if jamming occurs while raising the backrest (Yes at S16), the motor 64c is stopped immediately (S18), and rotation is inverted (S22), and the backrest is tilted again.

Continuously, jamming detection by judging whether the change rate of a pulse period is under a specified value or not in the first embodiment is explained below.

In the first embodiment, depending on whether the integrated value of change amounts of a pulse period exceeds a specified threshold or not, jamming by the backrest is detected. Specifically, in the pulses shown in FIG. 8 (B) (only $P_{147}$ to $P_{151}$ are shown in the diagram), the change amount of 150 pulse periods are integrated according to formula 1.

$$A = P_2/P_1 + P_3/P_2 + \ldots P_{n+1}/P_n \qquad \text{[formula 1]}$$

That is, the integrated value of change amounts of 150 pulses from $P_1$ to $P_{150}$, the integrated value of change amounts of 150 pulses from $P_2$ to $P_{151}$, the integrated value of change amounts of 150 pulses from $P_3$ to $P_{152}$, and so forth are judged to exceed a specified threshold (for example, 160) or not, and jamming is detected. This threshold is preferred to be set at an intermediate value between the maximum value of causing warp and value of causing jamming.

As explained above with reference to FIG. 8 (B), when warp occurs, the load increases suddenly, and the pulse period becomes longer in a short time, and the change rate of the pulse period rises sharply as shown in FIG. 8 (D). On the other hand, as explained in FIG. 8 (C), when jamming occurs, the load becomes higher gradually, and the pulse period becomes longer gradually, and the change rate of the pulse period becomes higher gradually as shown in FIG. 8 (D).

Figure 6:
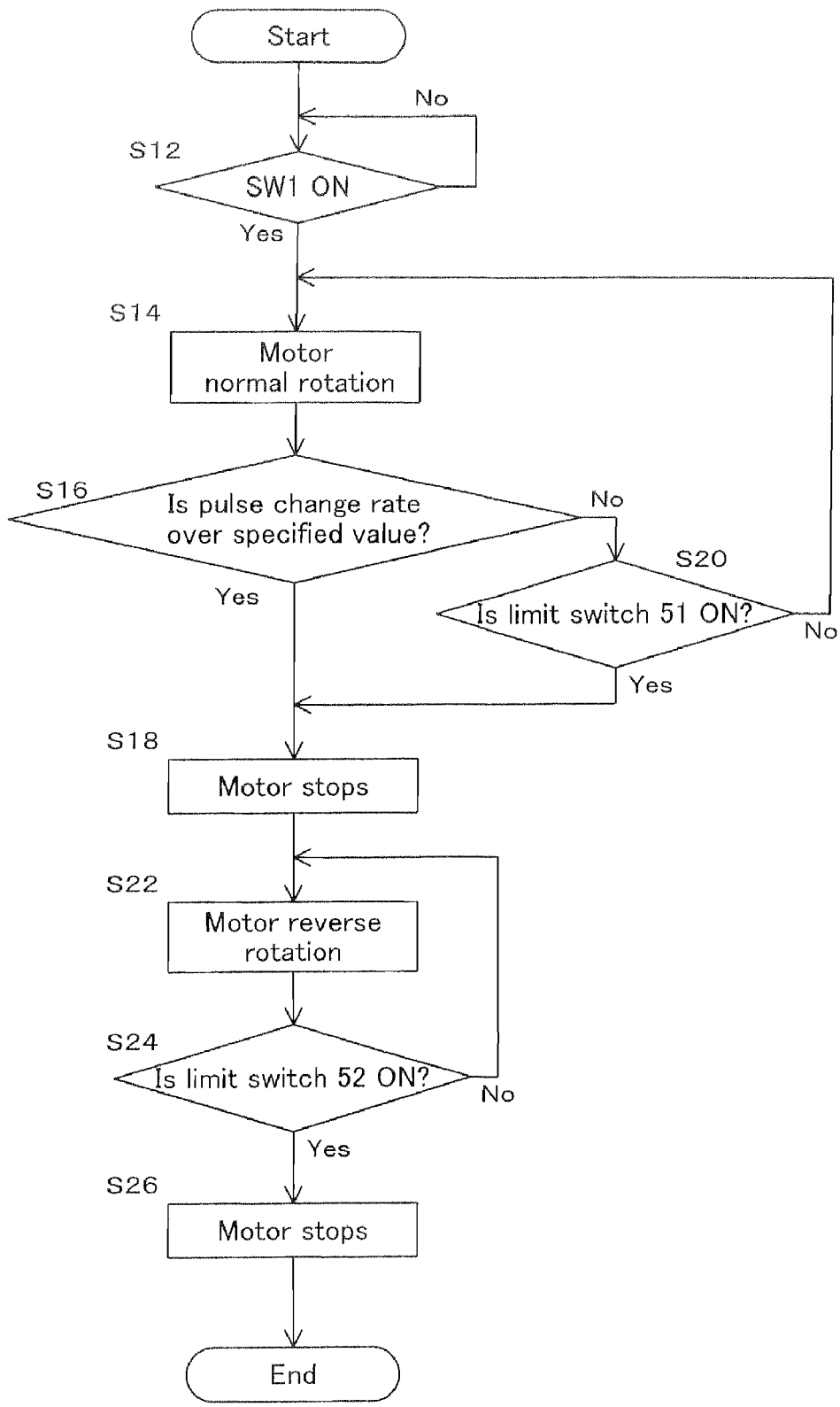
FIG. 6 is a flowchart of motor control by a CPU.
Figure 9:
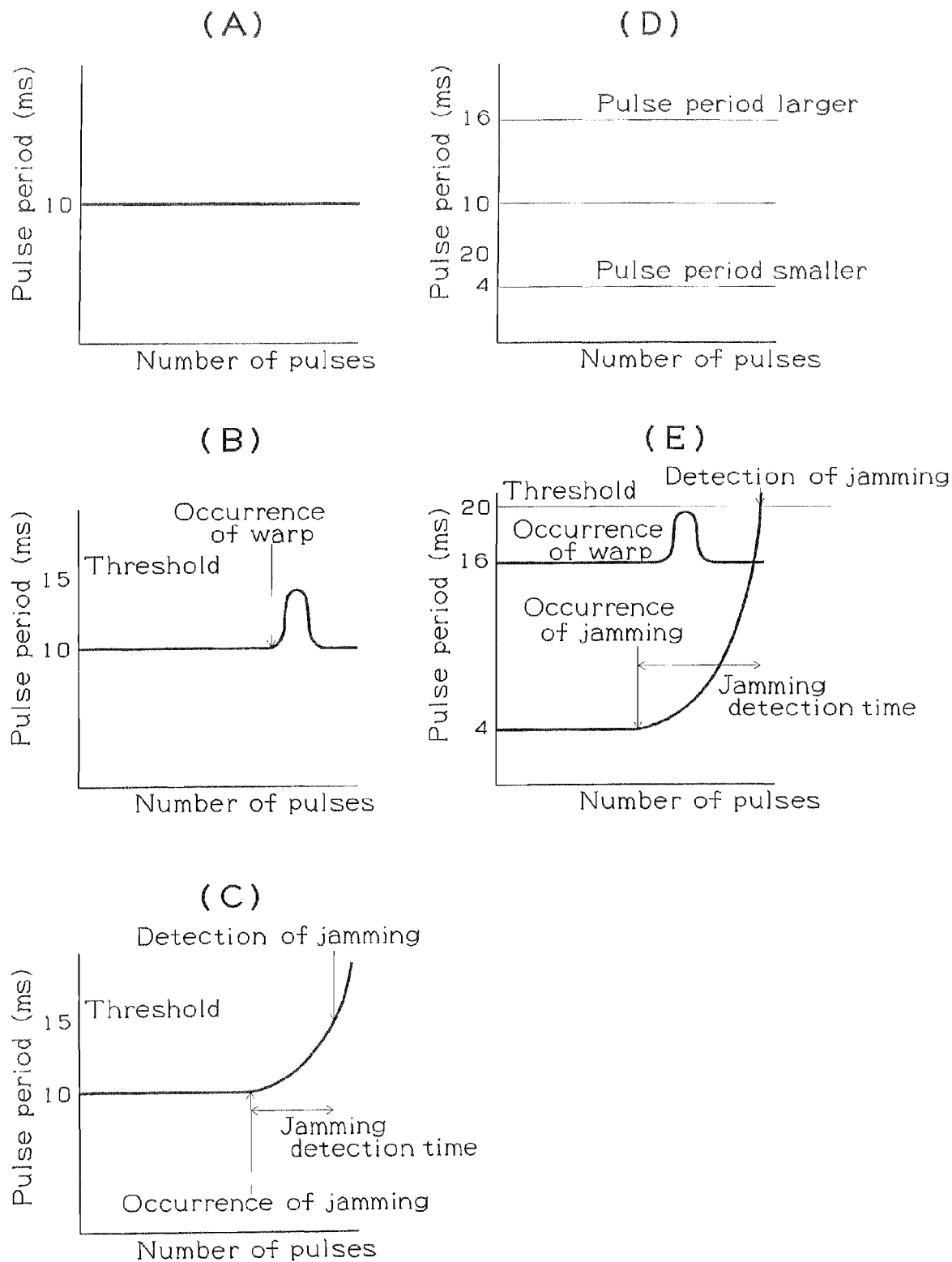
FIG. 9 (A) is a graph of a pulse period, FIG. 9 (B) is a graph upon occurrence of warp, FIG. 9 (C) is a graph upon occurrence of jamming, FIG. 9 (D) is a graph showing fluctuations of a pulse period, and FIG. 9 (E) is a graph showing a pulse period and a threshold.

Accordingly, in the first embodiment, as explained above, the ratio (change amount) of one pulse period and the next pulse period is integrated for 150 pulses (150 if there is no change in period) is compared with an intermediate value (threshold 160) between the maximum value of causing warp and the value of causing jamming, and when the integrated value exceeds the threshold, it is regarded as occurrence of jamming, and as explained in FIG. 6, raising of the backrest is stopped, and the motor is rotated reversely, and the backrest is inclined to the tilting side, and jamming is cleared.

In the motor drive device of the first embodiment, the ratio of one pulse period and the next pulse period outputted after this pulse is integrated for an arbitrary number of times, and judging if this integrated value exceeds the specified threshold or not, jamming by the backrest is detected. Accordingly, if the backrest rubs against an adjacent backrest and the motor speed drops suddenly for a short time, such warp is not detected falsely as jamming, and actual occurrence of jamming can be detected securely. Since the period of one pulse is calculated, the operation is simple and easy.

In the first embodiment, since the total of pulse period change rates of a specific number of times is calculated by integration, if noise mixes in, possibility of false detection of jamming is very low.

In the first embodiment, the limit switch 51 is provided at the side of the bracket 21. Instead, the limit switch 51 may be provided in the holding bracket 43, and disposed at a position contacting with the operation protrusion 44a when the sector gear 44 is returned to the backrest 12, and returning operation of the sector gear 44 may be detected.

Second Embodiment

The motor drive device in a second embodiment is explained. The configuration of the control circuit composing the motor drive device and the vehicle seat driven by the control circuit is same as in the first embodiment explained in FIG. 1 to FIG. 5, and the explanation is omitted.

As explained in FIG. 8 in the first embodiment, the ratio (change amount) of one pulse period and the next pulse period is integrated for 150 pulses. In the second embodiment, by contrast, as shown in formula 2, the ratio of an arbitrary first number x of pulse periods, and the same number of pulse periods as the arbitrary first number x outputted from the rotation detector after the arbitrary first number x of pulses is integrated for an arbitrary second number y of times.

$$\sum_{z=1}^{y} \frac{A_{N-y+z}}{A_{N-x-y+z}} = \frac{A_{N-y+1}}{A_{N-y-x+1}} + \ldots + \frac{A_{N-1}}{A_{N-x+1}} + \frac{A_N}{A_{N-x}} \quad \text{[formula 2]}$$

where N=1, 2, 3, ... (number of pulses)

$$A_N = \frac{\sum_{n=N-x+1}^{N} a_n}{x}$$

(average of pulse waveforms for removing noise)

x: arbitrary (number to be averaged)
y: arbitrary (number for integrating change rates)

$$\frac{A_N}{A_{N-x}} \quad \text{[formula 3]}$$

is expressed as shown in FIG. 7 (A).

$$\frac{A_{N-1}}{A_{N-x-1}} \quad \text{[formula 4]}$$

is expressed as shown in FIG. 7 (B).

$$\frac{A_{N-y}}{A_{N-y-x}} \quad \text{[formula 5]}$$

is expressed as shown in FIG. 7 (C).

In the motor drive device of the second embodiment, the ratio of an arbitrary first number x of pulse periods, and the same number x of pulse periods as the arbitrary first number x outputted after the arbitrary first number of pulses is integrated for an arbitrary second number y of times, and by judging if the integrated value exceeds a specified threshold or not, jamming by the movable part is detected. Accordingly, if the motor speed drops suddenly for a short time, for example, if the movable part contacts with other members, such phenomenon is not detected falsely as jamming, only actual jamming is detected securely.

INDUSTRIAL APPLICATION

In the foregoing embodiments, the configuration of the invention is applied in a power seat, but the configuration of the invention may also be applied in a power window, a power trunk and others. In the embodiments, the change amounts of pulse periods are integrated, but, instead of this, for example, change amounts of pulse width may be also integrated.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A motor drive device for a backrest of a vehicle seat comprising:
    a motor for driving a movable backrest of a vehicle seat;
    a motor control device for controlling normal rotation, stop or reverse rotation of the motor;
    a rotation detector for detecting rotation of the motor and outputting a pulse corresponding to the motor speed; and
    the motor control device detecting jamming by the movable backrest against other members in the vehicle by judging whether an integral value of change amounts of a pulse period from the rotation detector exceeds a specified threshold or not, and stops or inverts the motor, wherein the integration of change amounts of the pulse period by the motor control device is executed by:
    integrating the ratio of an arbitrary first number of pulse periods, and the same number of pulse periods as the arbitrary first number outputted from the rotation detector after the arbitrary first number of pulses, for an arbitrary second number of times.

2. The motor drive device according to claim 1, wherein the arbitrary first number is one.

3. A motor drive device for a backrest of a vehicle seat comprising:
    a motor for driving a movable backrest of a vehicle seat;
    a motor control device for controlling normal rotation, stop or reverse rotation of the motor;
    a rotation detector for detecting rotation of the motor and outputting a pulse corresponding to the motor speed;
    the motor control device detecting jamming by the movable backrest against other members in the vehicle by judging whether an integral value of change amounts of a pulse period from the rotation detector exceeds a specified threshold or not, and stops or inverts the motor; and
    a switch for detecting when the backrest has returned to a specific position;
    wherein the motor control device controls normal rotation of the motor, stop rotation of the motor, and reverse rotation of the motor, and the motor control device controls stop rotation and reverse rotation due to the detection of a specific position of the backrest by the switch; and
    the motor drive device stops and inverts the motor so as to release the jamming by the backrest when the integral value of the change amount of the pulse period from the rotation detector exceeds a specific threshold.

* * * * *